United States Patent
Boothalingam

(10) Patent No.: US 11,392,639 B2
(45) Date of Patent: Jul. 19, 2022

(54) METHOD AND APPARATUS FOR AUTOMATIC SPEAKER DIARIZATION

(71) Applicant: Uniphore Software Systems, Inc., Palo Alto, CA (US)

(72) Inventor: Maragathamani Boothalingam, Chennai (IN)

(73) Assignee: Uniphore Software Systems, Inc., Palo Alto, CA (US)

( * ) Notice: Subject to any disclaimer, the term of this patent is extended or adjusted under 35 U.S.C. 154(b) by 84 days.

(21) Appl. No.: 16/836,850

(22) Filed: Mar. 31, 2020

(65) Prior Publication Data
US 2021/0303619 A1    Sep. 30, 2021

(51) Int. Cl.
*G06F 16/65*    (2019.01)
*G06F 16/683*   (2019.01)
*G10L 25/93*    (2013.01)

(52) U.S. Cl.
CPC ......... *G06F 16/65* (2019.01); *G06F 16/685* (2019.01); *G10L 25/93* (2013.01)

(58) Field of Classification Search
CPC ...... G06F 16/285; G06F 3/0481; G06F 16/35; G06F 11/3006; G06F 16/355; G06F 16/3329; G06F 16/353; G06F 16/65; G06F 16/685; G06F 40/30; G10L 17/00; G10L 15/20; G10L 15/02; G10L 15/08; G10L 15/26; G10L 17/16; G10L 19/00; G10L 21/0272; G10L 25/03; G10L 25/27; G10L 25/78; G10L 25/93; G10L 25/24; G10L 17/08; G10L 15/04; G10L 25/60; G06K 9/627; G06K 9/00892; G06K 9/6215; G06K 9/6267
See application file for complete search history.

(56) References Cited

U.S. PATENT DOCUMENTS

2018/0218738 A1* 8/2018 Gorodetski ............. G10L 17/04

FOREIGN PATENT DOCUMENTS

| WO | WO-2019227672 A1 * | 12/2019 | ............ G10L 17/00 |
| WO | WO-2020146042 A1 * | 7/2020  | ............ G10L 15/04 |

OTHER PUBLICATIONS

Madikeri et al, KL-HMM Based Speaker Diarization System for Meetings, IEEE ICASSP 2015, pp. 4435-4439 (Year: 2015).*
Khoury et al, Speaker Diarization: Towards A More Robust and Portable System, 2007 IEEE ICASSP 2007, pp. 489-492 (Year: 2007).*
Vijayasenan et al, KL Realignment for Speaker Diarization with Multiple Feature Streams, IDIAP Research Report, Jul. 2010, pp. 1-6 (Year: 2010).*

* cited by examiner

*Primary Examiner* — Linda Wong
(74) *Attorney, Agent, or Firm* — Praveer K Gupta

(57) ABSTRACT

A method and an apparatus for automatic speaker diarization is provided. The method includes removing, at a call analytics server (CAS), non-speech portions from a call audio to produce a pre-processed audio, the call audio comprising speech from at least two speakers. Next, the pre-processed audio is divided, at the CAS, to multiple audio segments, each segment corresponding to speech from a single speaker of the at least two speakers. Next, the plurality of segments are clustered, at the CAS, into at least two groups corresponding the at least two speakers.

12 Claims, 3 Drawing Sheets

METHOD AND APPARATUS FOR AUTOMATIC SPEAKER DIARIZATION

FIELD

The present invention relates generally to improving call center computing and management systems, and particularly to automatic speaker diarization.

BACKGROUND

Several businesses need to provide support to its customers, which is provided by a customer care call center. Customers place a call to the call center, where customer service agents address and resolve customer issues. Computerized call management systems are customarily used to assist in logging the calls, and implementing resolution of customer issues. An agent, who is a user of a computerized call management system, is required to capture the issues accurately and plan a resolution to the satisfaction of the customer. One of the tools to assist the agent is automatic speech recognition (ASR), for example, as performed by one or more ASR engines as well known in the art. ASR is used to transcribe speech to text, which may then be further processed to assist the agent. However, before being processed by the ASR engine, the audio needs to be partitioned into segments associated with each speaker, for example, the customer and the agent. While attempts have been made, conventional solutions suffer from being too resource intensive, inaccurate, among other disadvantages.

Therefore, there exists a need for better techniques for automatic speaker diarization.

SUMMARY

The present invention provides a method and an apparatus for automatic speaker diarization, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for automatic speaker diarization. Audio of a call comprising two speakers, for example, an agent and a customer, is processed first to remove portions that do not contain speech. Next, the audio with removed non-speech portions is segmented into portions (segments) having speech of a single speaker only. That is, each segment contains speech from one speaker only. Segmentation includes calculating the Kullback-Leibler (KL) divergence measure, which is used to measure the dissimilarity of the Gaussian Distributions. The dissimilarity enables change point detection (CPD), which yields separated audio segments for each speaker. Next, the separated audio segments are clustered into groups, one for each speaker. Clustering includes deriving mel frequency cepstral coefficients (MFCC) value for each of the audio segments. The MFCC values for each audio segment are then clustered using well-known clustering techniques, for example, K-means, to generate two groups of audio segments, one corresponding to each speaker.

Figure 1:
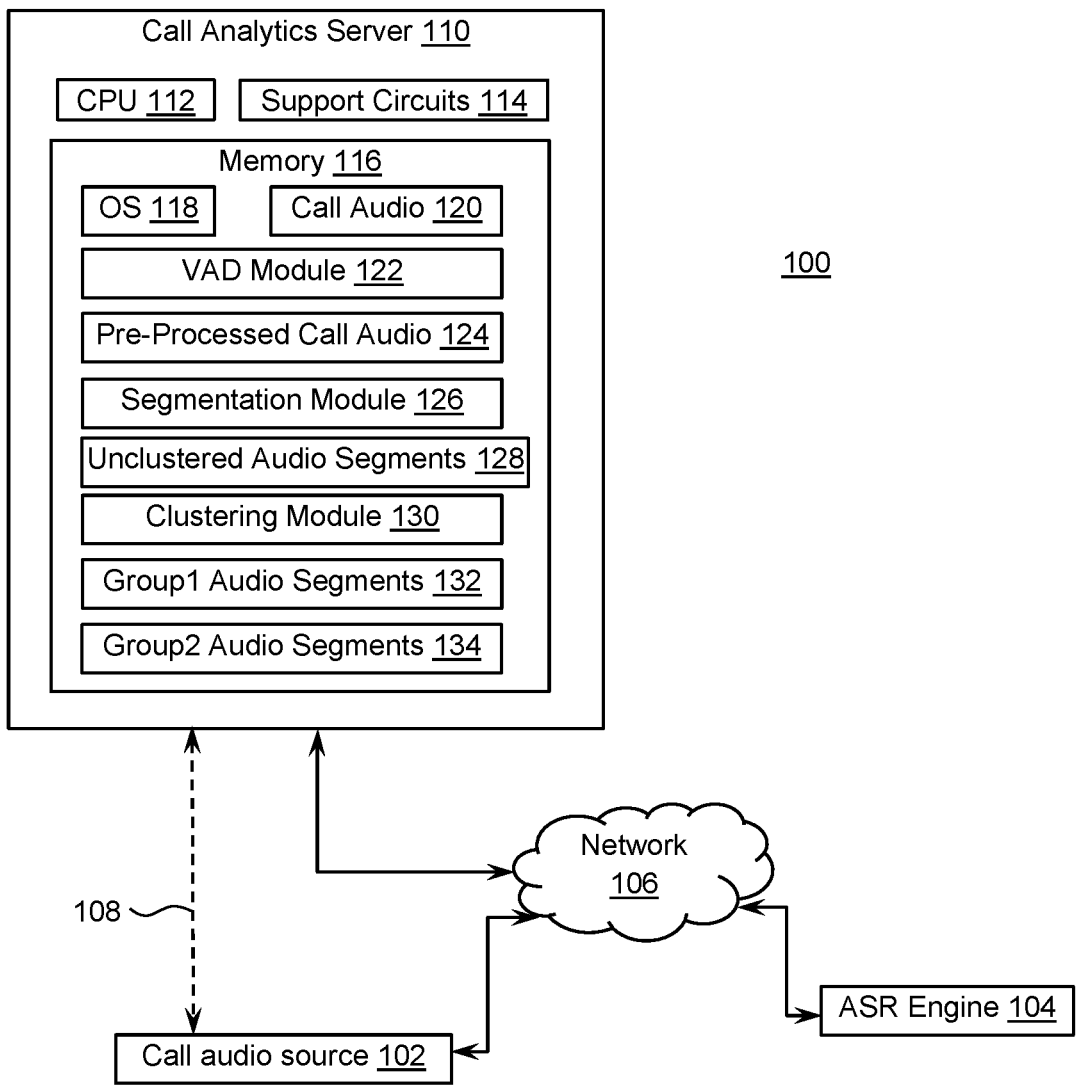
FIG. 1 is a schematic diagram depicting an apparatus for automatic speaker diarization, in accordance with an embodiment of the present invention.

FIG. 1 is a schematic diagram an apparatus 100 for improving efficiency of automatic speech recognition, in accordance with an embodiment of the present invention. The apparatus 100 is deployed, for example, in a call center. The apparatus 100 comprises a call audio source 102, an ASR engine 104, and a call analytics server (CAS) 110, each communicably coupled via a network 106. In some embodiments, the call audio source 102 is communicably coupled to the CAS 110 directly via a link 108, separate from the network 106, and may or may not be communicably coupled to the network 106.

The call audio source 102 provides audio of a call to the CAS 110. In some embodiments, the call audio source 102 is a call center providing live audio of an ongoing call. In some embodiments, the call audio source 102 stores multiple call audios, for example, received from a call center.

The ASR engine 104 is any of the several commercially available or otherwise well-known ASR engines, providing ASR as a service from a cloud-based server, or an ASR engine which can be developed using known techniques. The ASR engines are capable of transcribing speech data to corresponding text data using automatic speech recognition (ASR) techniques as generally known in the art.

The network 106 is a communication network, such as any of the several communication networks known in the art, and for example a packet data switching network such as the Internet, a proprietary network, a wireless GSM network, among others. The network 106 communicates data to and from the call audio source 102 (if connected), the ASR engine 104 and the CAS 110.

The CAS server 110 includes a CPU 112 communicatively coupled to support circuits 114 and a memory 124. The CPU 112 may be any commercially available processor, microprocessor, microcontroller, and the like. The support circuits 114 comprise well-known circuits that provide functionality to the CPU 112, such as, a user interface, clock circuits, network communications, cache, power supplies, I/O circuits, and the like. The memory 116 is any form of digital storage used for storing data and executable software.

Such memory includes, but is not limited to, random access memory, read only memory, disk storage, optical storage, and the like.

The memory 116 includes computer readable instructions corresponding to an operating system (OS) 118, a call audio 120 (for example, received from the call audio source 102), a voice activity detection (VAD) module 122, a pre-processed audio 124, a segmentation module 126, unclustered audio segments 128, a clustering module 130, and two groups of audio segments, group1 132 and group2 134.

According to some embodiments, the VAD module 122 generates the pre-processed audio 124 by removing non-speech portions from the call audio 120. The non-speech portions include, without limitation, beeps, rings, silence, noise, music, among others. Upon removal of the non-speech portion, the segmentation module 126 divides the pre-processed call audio 124 to generate multiple audio segments 128 having discrete speech segments, each of a single speaker, which segments are not otherwise organized or grouped. The clustering module 130 then clusters the multiple audio segments 128 generated by the segmentation module 126 into two groups, Group1 132 corresponding to a first speaker of the call audio 120, and Group2 134 corresponding to a second speaker of the call audio 120. Each of the groups of audio segments 132, 134 may be sent for further processing individually, for example, to an automatic speech recognition (ASR) engine 104 implemented at a remote location communicably coupled via the network 106, or in some embodiments, implemented on the CAS 110.

Figure 2:
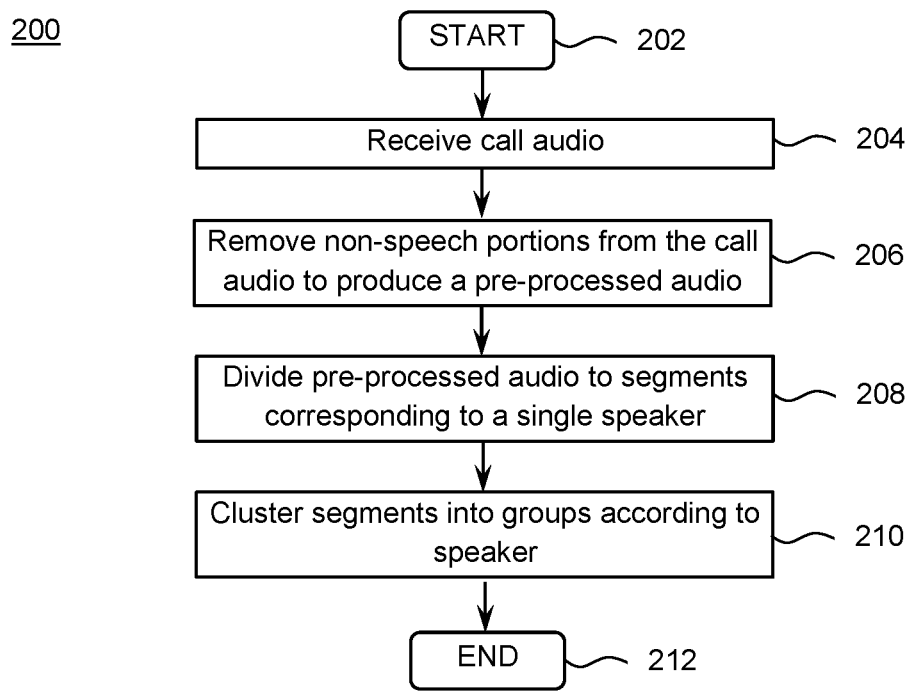
FIG. 2 is a flow diagram of a method for automatic speaker diarization, for example, as performed by the apparatus of FIG. 1, in accordance with an embodiment of the present invention.

FIG. 2 is a flow diagram of a method 200 for improving efficiency of automatic speech recognition, for example, as performed by the apparatus 100 of FIG. 1, in accordance with an embodiment of the present invention. According to some embodiments, the method 200 is performed by the various modules executed on the CAS 110. The method 200 starts as step 202, and proceeds to step 204, at which the method 200 receives a call audio, for example, the call audio 120. The call audio 120 may be a pre-recorded audio received from an external device such as the call audio source 102, for example, a call center or a call audio storage, or recorded on the CAS 110 from a live call in a call center. In some embodiments, the call audio 120 is either received at the CAS 100, or converted on the CAS 110, to a specific format, before being further processed. Conversion to a specific format makes further processing, for example, by the VAD module 122, the segmentation module 126 or the clustering module 130 more efficient.

The method 200 proceeds to step 206, at which the method 200 removes portions of the call audio 120 that do not include speech. Such non-speech audio portions include, without limitation, beeps, rings, silence, noise, music, among others. In some embodiments, the VAD module 122 removes the non-speech portions. The VAD module 122 has four sub-modules (not shown separately), Beep & Ring Elimination module, Silence Elimination module, Standalone Noise Elimination module and Music Elimination module. Beep & Ring Elimination module analyzes discrete portions (e.g., each 450 ms) of the call audio for a specific frequency range, because beeps and rings have a defined frequency range according to the geography. Silence Elimination module analyzes discrete portions (e.g., each 10 ms) of the audio and calculates Zero-Crossing rate and Short-Term Energy to detect silence. Standalone Noise Elimination module detects standalone noise based on the Spectral Flatness Measure value calculated over a discrete portion (e.g., a window of size 176 ms). Music Elimination module detects music based on "Null Zero Crossing" rate on discrete portions (e.g., 500 ms) of audio chunks. Upon removing such non-speech portions from the call audio 120, the method 200 generates or produces the pre-processed audio 124 comprising only portions which contain speech.

The method 200 proceeds to step 208, at which the method 200 divides or segments the pre-processed audio 124 to segments corresponding to a single speaker. That is, each segmented audio segment contains speech from when one speaker begins speaking to when that speaker ends speaking, marked by another speaker starting to speak, silence or other non-speech portion, or termination of the audio. In some embodiments, the segmentation module 126 performs the step 208.

Dividing the audio to segments having speech of a single speaker of step 208, is also referred to as segmentation. Segmentation involves splitting the audio 120 at points where a change of a speaker in the audio is detected. This phenomenon is referred to as change point detection (CPD) and is based on identifying changes in the KL (Kullback-Leibler) divergence measure.

Figure 4:
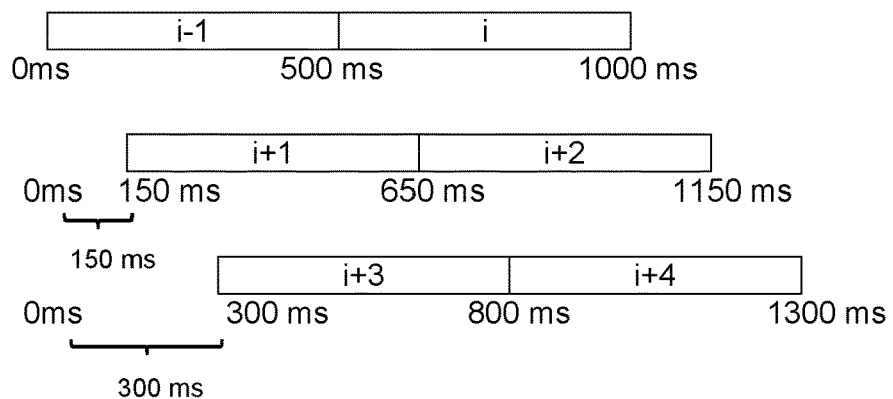
FIG. 4 is a schematic illustration of shifting of adjacent time-windows for calculation of KL divergence measure, as performed by the method of FIG. 2, in accordance with an embodiment of the present invention.

At step 208, the pre-processed audio 124 obtained at step 206 is first divided into small, non-overlapping, adjacent time-windows, for further evaluation and comparison. Next, KL divergence measure is determined for two such adjacent time-windows. Next, the adjacent time-windows are shifted forward by a pre-defined resolution window along the time axis, and the KL divergence measure is determined for the two adjacent time-windows moved ahead, along the time axis. According to some embodiments, in a call center environment, a time-window size of 500 ms is used for short duration of speaker segments expected in call center conversations, and according to some embodiments, the resolution window of 150 ms is used to shift forward the adjacent time-windows, for example, as shown in FIG. 4.

KL divergence measure is the dissimilarity of the Gaussian distributions of the speech in one time-window and speech in the adjacent time-window. The KL Divergence measure is calculated according to the KL distance between $i^{th}$ and $j^{th}$ window, and is defined as:

$$D(i,j)=½[\log|\Sigma j|/|\Sigma i|+tr(\Sigma j-\Sigma i)+(\mu j-\mu i)T\Sigma j-1(\mu j-\mu i)],$$

where $\Sigma$ denotes determinant, $\mu$ denotes mean vector, tr denotes trace of matrix.

Figure 3:
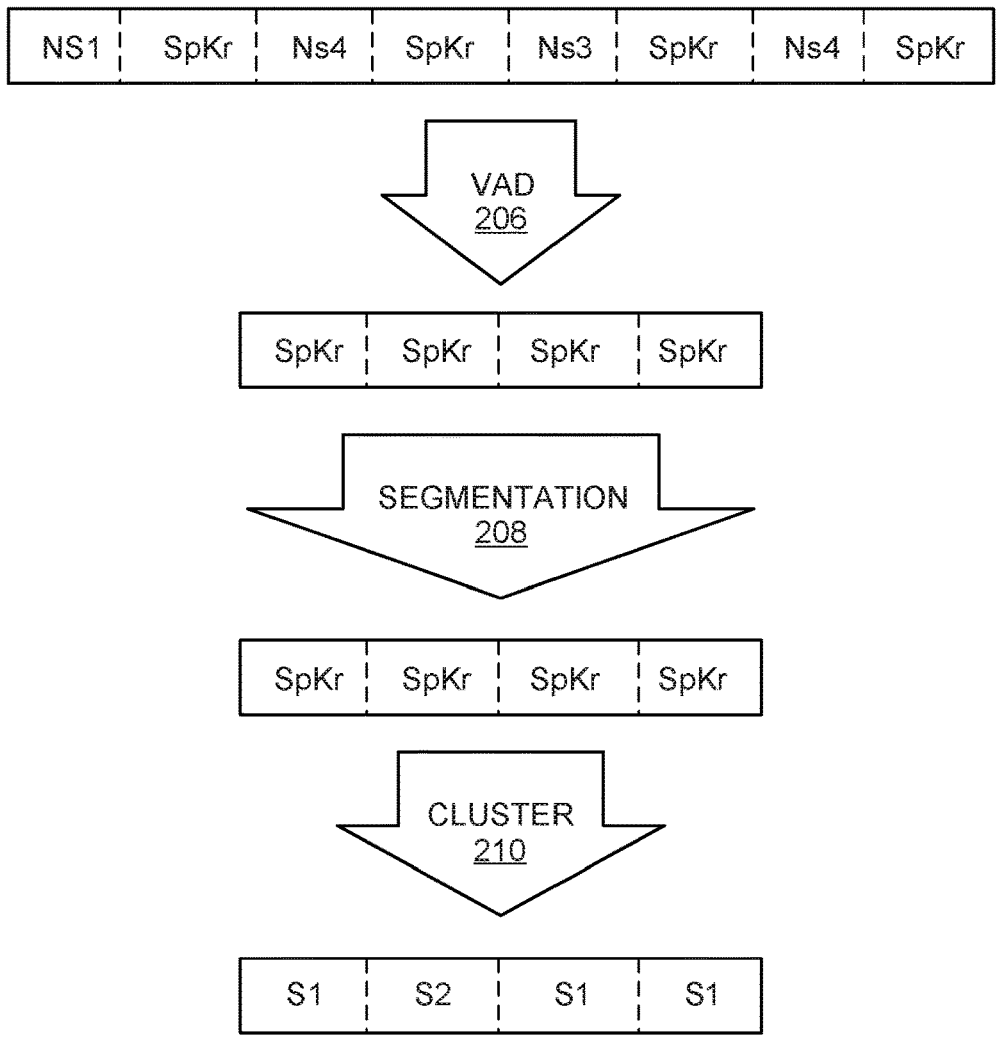
FIG. 3 is a schematic illustration of the method for automatic speaker diarization, as performed by the method of FIG. 2, in accordance with an embodiment of the present invention.

The KL divergence measure, D, is calculated for two adjacent time-windows (e.g., each 500 ms, at i−1 and i). Then the adjacent time-windows are moved forward by the resolution window of 150 ms (e.g., at i+1 and i+2). Then the adjacent time-windows are moved forward by the resolution window of 150 ms (e.g., at i+3 and i+4). Change point is detected between the $i^{th}$ frame and the adjacent $(i+1)^{th}$ frame, if the following conditions are satisfied:

$D(i,i+1)>D(i+1,i+2)$; and     Condition 1:

$D(i,i+1)>D(i-1,i)$.     Condition 2:

Further, any change point detected in portions that are silent is considered a valid change point if the current and next change point is not a contiguous silence. The pre-processed call audio 124 is split at each such change point to yield multiple segments, each segment comprising a speech portion of a single speaker. In this manner, the segmentation module 126 calculates the Kullback-Leibler (KL) divergence from the numerical array, and then, performs change point detection (CPD) to yield segmented or divided audio segments, each having speech of only one speaker, for example, as also illustrated in the schematic of FIG. 3, illustrated with respect to the steps 206-210 of the method 200.

The method 200 proceeds to step 210, at which the method 200 clusters the segmented audio segments generated at step 208, into two groups, one group for each speaker. Each audio segment is divided into chunks of 32 ms (although in other embodiments, different chunk size may be used), and for each chunk, 13 MFCC values are calculated. For example, if a segment is 3 sec long, it would contain 92 chunks of 32 ms, and 1 chunk of 24 ms, or a total of 93 chunks. MFCC values are calculated for each of the 93 chunks, 13 MFCC values for each of the 93 chunks. Next, an average of each of the 13 MFCC values for all 93 chunks is calculated, yielding an average of mean 13 MFCC values for the segment of 3 s. For each segment, the mean or average MFCC values may be represented as an array of dimension 1×13.

Similar calculations are made to derive average MFCC value for each of the segments, and the average MFCC values for each segment are used for the clustering. For example, the clustering module 130 performs the step 210, and includes dividing each segment to chunks of 32 ms, deriving the MFCC values for each chunk, and calculating numerical value representation array with average MFCC values for each segment. Next, the clustering module 130 performs one or more of well-known clustering techniques on the average MFCC values for each segment, for example, K-means, to generate two groups of audio segments, one corresponding to each speaker. In some embodiments, supplemental or additional clustering is done using known artificial intelligence/machine learning (AI/ML) techniques.

The method 200 proceeds to step 212, at which the method 200 ends.

While conventional systems are focused on controlled environments, such as broadcast audio in case of news, or meeting room recordings, and the like. In such controlled environment, noise is eliminated, reduced or otherwise handled before or during the recoding, and the recorded audio is contains low noise. On the other hand, telephonic conversations, such as in call center environments, are usually not that well controlled with respect to noise. Most conventional systems handling telephonic conversations are supervised, and such models need to be trained extensively for audio recorded in different environments. Advantageously, the techniques described above present a solution which is unsupervised, and handles different noises at each stage.

The described embodiments advantageously enable speaker diarization for a mono recorded call. Accuracy of each stage of removal of non-speech portions has been proven, assuring the accuracy of the segments 128, without interfering with the speech characteristics of audio. In some embodiments, the non-speech portions are removed in the specific order as follows. Peak frequency is calculated to identify beeps and rings, which are eliminated first, to obtain an audio free from dial or machine generated tone. Next, pure silences are removed so that the rest of audio would contain standalone noises, speech parts, or music, if any. Next, standalone noises such as those originating from equipment such as air conditioners or air vents, cafeteria, noise involving keystroke taps, and other well-known noises, for example, when either of speakers are not speaking, are removed. After the removal of standalone noise, removal of instrumental music is performed, which is a complex process. However, due to the selected order of removal of other noises, unparalleled accuracy in removal of instrumental music and/or the overall removal of non-speech portions is achieved. Due to the efficiencies enabled by the above methodology, the precision of the overall method and apparatus is increased significantly. Further, due to accurate non-speech portion removal, the segmentation and clustering also enjoys high accuracy.

While the above discussion is illustrated with examples of two speakers, those skilled in the art would appreciate that the techniques described above could be extended to separate voice segments of more than two speakers. For example, the number of speakers may be provided as an input to the clustering step 210, which would then proceed to cluster the average MFCC values for each segment accordingly.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

I claim:

1. A method for automatic speaker diarization, the method comprising:

removing, at a call analytics server (CAS), non-speech portions from a call audio to produce a pre-processed audio, the call audio comprising speech from at least two speakers;

dividing, at the CAS, the pre-processed audio to a plurality of audio segments, each segment of the plurality of segments corresponding to speech from a single speaker of the at least two speakers, wherein the dividing comprises:

selecting a first time-window of the call audio at position i−1, and a second time-window of the call audio at position i, the second time-window equal to the first time-window in duration, and the second time-window next and adjacent to the first time-window, where i is an integer greater than 0;

calculating the Kullback-Leibler (KL) divergence measure for each of the first time-window at i−1 and the second-time window at i;

shifting the first time-window and the second window by a duration of a pre-defined time resolution to positions i+1 and i+2, respectively;

calculating the Kullback-Leibler (KL) divergence measure (D) for each of the first time-window at i+1 and the second-time window at i+2; and detecting a change point if the following conditions are met:

$$D(i,i+1) > D(i+1,i+2), \text{ and} \qquad \text{Condition 1:}$$

$$D(i,i+1) > D(i-1,i), \text{ and} \qquad \text{Condition 2:}$$

clustering, at the CAS, the plurality of segments into at least two groups corresponding the at least two speakers.

2. The method of claim 1, further comprising receiving, at the CAS, the call audio from a call audio source.

3. The method of claim 1, wherein the removing comprises removing portions comprising at least one of beeps, rings, silence, noise, or music.

4. The method of claim 1, wherein the clustering comprises: deriving the mel frequency cepstral coefficients (MFCC) values for each audio segment of the plurality of audio segments; calculating numerical array with MFCC values for each audio segment; and perform a clustering technique to yield the at least two groups of audio segments.

5. An apparatus for automatic speaker diarization, the apparatus comprising:
- a processor; and
- a memory communicably coupled to the processor, wherein the memory comprises computer-executable instructions, which when executed using the processor, perform a method comprising:
- removing, at a call analytics server (CAS), non-speech portions from a call audio to produce a pre-processed audio, the call audio comprising speech from at least two speakers,
- dividing, at the CAS, the pre-processed audio to a plurality of audio segments, each segment of the plurality of segments corresponding to speech from a single speaker of the at least two speakers, wherein the dividing comprises:
- selecting a first time-window of the call audio at position i−1, and a second time-window of the call audio at position i, the second time-window equal to the first time-window in duration, and the second time-window next and adjacent to the first time-window, where i is an integer greater than 0,
- calculating the Kullback-Leibler (KL) divergence measure (D) for each of the first time-window at i−1 and the second-time window at i,
- shifting the first time-window and the second window by a duration of a pre-defined time resolution to positions i+1 and i+2, respectively,
- calculating the Kullback-Leibler (KL) divergence measure for each of the first time-window at i+1 and the second-time window at i+2, and detecting a change point if the following conditions are met:

$$D(i,i+1) > D(i+1,i+2), \text{ and} \qquad \text{Condition 1:}$$

$$D(i,i+1) > D(i-1,i), \text{ and} \qquad \text{Condition 2:}$$

clustering, at the CAS, the plurality of segments into at least two groups corresponding the at least two speakers.

6. The apparatus of claim 1, wherein the method further comprises receiving, at the CAS, the call audio from a call audio source.

7. The apparatus of claim 1, wherein the removing comprises removing portions comprising at least one of beeps, rings, silence, noise, or music.

8. The apparatus of claim 1, wherein the clustering comprises: deriving the mel frequency cepstral coefficients (MFCC) values for each audio segment of the plurality of audio segments; calculating numerical array with MFCC values for each audio segment; and perform a clustering technique to yield the at least two groups of audio segments.

9. A non-transitory computer-readable storage medium, the computer-readable storage medium including instructions that when executed by a computer, cause the computer to:
- remove, at a call analytics server (CAS), non-speech portions from a call audio to produce a pre-processed audio, the call audio comprising speech from at least two speakers;
- divide, at the CAS, the pre-processed audio to a plurality of audio segments, each segment of the plurality of segments corresponding to speech from a single speaker of the at least two speakers, wherein the dividing comprises:
- select a first time-window of the call audio at position i−1, and a second time-window of the call audio at position i, the second time-window equal to the first time-window in duration, and the second time-window next and adjacent to the first time-window, where i is an integer greater than 0;
- calculate the Kullback-Leibler (KL) divergence measure for each of the first time-window at i−1 and the second-time window at i; shift the first time-window and the second window by a duration of a pre-defined time resolution to positions i+1 and i+2, respectively;
- calculate the Kullback-Leibler (KL) divergence measure (D) for each of the first time-window at i+1 and the second-time window at i+2; and detect a change point if the following conditions are met:

$$D(i,i+1) > D(i+1,i+2), \text{ and} \qquad \text{Condition 1:}$$

$$D(i,i+1) > D(i-1,i), \text{ and} \qquad \text{Condition 2:}$$

cluster, at the CAS, the plurality of segments into at least two groups corresponding the at least two speakers.

10. The computer-readable storage medium of claim 9, wherein the instructions further configure the computer to receive, at the CAS, the call audio from a call audio source.

11. The computer-readable storage medium of claim 9, wherein the remove comprises removing portions comprising at least one of beeps, rings, silence, noise, or music.

12. The computer-readable storage medium of claim 9, wherein the clustering comprises: derive the mel frequency cepstral coefficients (MFCC) values for each audio segment of the plurality of audio segments; calculate numerical array with MFCC values for each audio segment; and perform a clustering technique to yield the at least two groups of audio segments.

* * * * *